Weber & Greene,
Draft Tube for Soda Water Apparatus.

N° 46,284.      Patented Feb. 7, 1865.

Witnesses:
F. Gould
S. B. Kidder

Inventors:
F. A. Weber & C. H. Greene
by their Atty
J. B. Crosby

UNITED STATES PATENT OFFICE.

FREDERICK A. WEBER AND WILLIAM H. GREENE, OF WOONSOCKET, R. I.

IMPROVED DRAFT-TUBE FOR SODA-WATER APPARATUS.

Specification forming part of Letters Patent No. 46,284, dated February 7, 1865.

*To all whom it may concern:*

Be it known that we, FREDERICK A. WEBER and WILLIAM H. GREENE, both of Woonsocket, in the county of Providence and State of Rhode Island, have invented an Improved Draft-Tube for Soda-Water Apparatus; and we do hereby declare that the following, taken in connection with the drawings which accompany and form part of this specification, is a description of our invention sufficient to enable those skilled in the art to practice it.

This invention relates to the construction of draft-tubes or cocks for soda-water apparatus, the invention having for its object the combination in one instrument of the tube for drawing sirups and that for drawing the aerated water in such manner that while the outlet of the main tube is of sufficient size to allow the free egress of the sirup the passage or part of an inner tube above its outlet is capable of being enlarged or diminished to regulate at pleasure the stream of soda or aerated water issuing therefrom.

Our invention consists in the peculiar construction given to the tube and its appendages for the purpose of regulating the flow of sirup and of soda-water.

It is well known that great difficulty is experienced in the preparation of beverages charged with carbonic-acid gas, (generally known as "soda-water,") in so mixing the sirup and aerated water as to have the sirup and water properly commingled and the beverage at the same time charged to the highest possible degree with the gas. If the eduction-orifice of the soda-water tube be so small as to give sufficient impetus to thoroughly mix the sirup with the charged water, the length of time taken to draw the same and its commotion or agitation in the glass liberates the gas and renders the beverage insipid. If, on the contrary, the aerated water is drawn in a large stream, the sirup is not sufficiently incorporated with it, and, although the well-known charging-bottles have heretofore been employed to a great extent, their use is attended with inconvenience and difficulty.

By our invention the sirup is first drawn through the tube, after which (the sirup being shut off) the size of the tube above the outlet is diminished and the aerated water turned on, said water being allowed at first to run from the tube with its full head in a very small stream, and afterward to run in an enlarged stream, and with its force broken or diminished the enlarged stream running in a shower, the force of which is regulated at pleasure.

Figure 1:
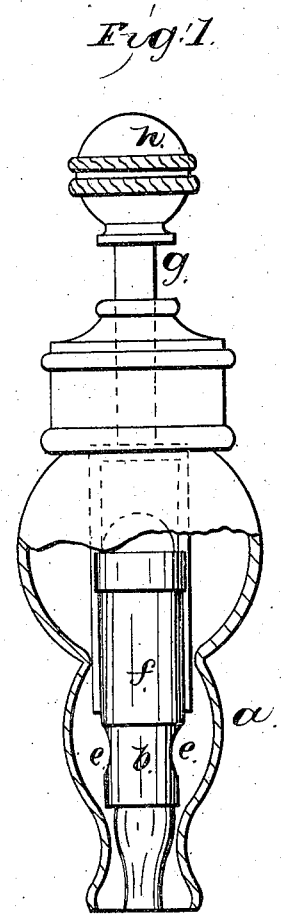
Figure 2:
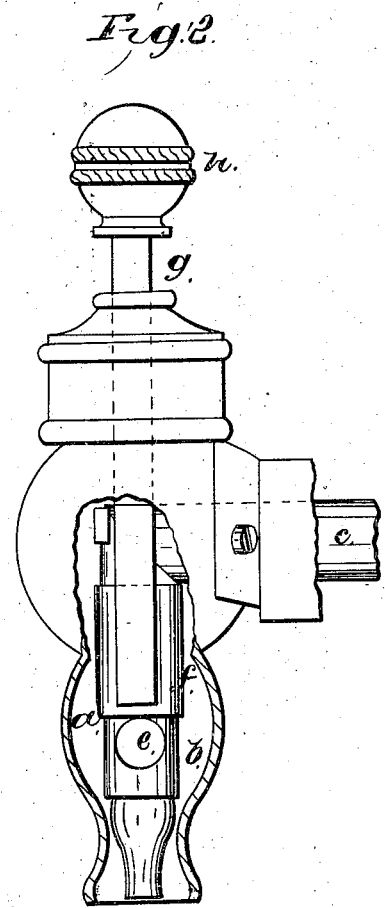
Figure 3:
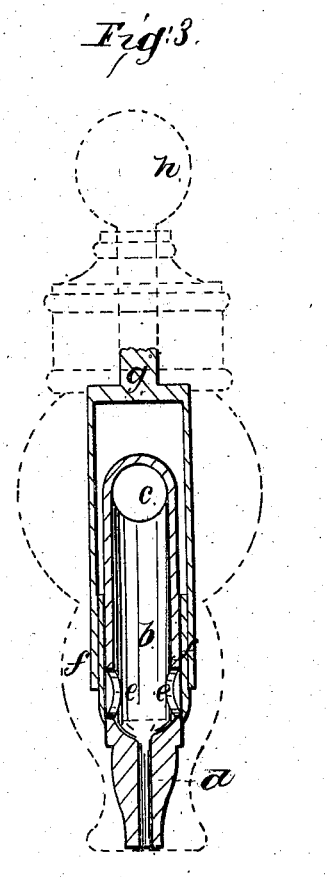

Our invention is embodied in the draft-tube shown in the drawings, Figure 1 representing a front view thereof, and Fig. 2 a side view, the tube being shown as broken to exhibit its interior structure. Fig. 3 is a vertical central and transverse section of the tube.

$a$ denotes the outer casing or tube; $b$, the inner tube, which is a continuation of or outlet for the pipe $c$, which, with its branches, extends to the soda-fountain and sirup-vessels.

The internal diameter of the tube $b$ is decreased at its lower end, as seen in Fig. 3, the small size of the outlet or passage $d$ so made being the most conducive to the complete intermingling of the sirup with the soda-water when the latter is discharged with the full head of the fountain and through this aperture alone into a tumbler containing the sirup. Just above this small passage in the tube $b$ said tube is provided with two large lateral orifices, $e$, opening into the tube $a$, the passage $d$ discharging at the bottom of and beyond the tube $a$. These lateral orifices $e$ are controlled by a cylindrical or tubular gate, $f$, which encircles or surrounds the tube $b$ and is connected with a stem, $g$, and handle $h$, as seen in the drawings.

In preparing a beverage, the sirup is first let into the pipe $c$ and tube $b$, the gate $f$ being raised by its stem into the position seen in Fig. 2, or to such extent as to allow the sirup to freely flow through the tube $b$, apertures $e$, and tube $a$ into the tumbler held or placed below. If the sirup be very thin, the gate may be raised but little, if at all, but generally it is preferable to let the sirup run with the whole extent of outlet. The handle $h$ is then depressed, (the sirup being previously cut off,) closing the lateral apertures $e$, and the soda-water is let on. With the full head of the fountain the direct action of the stream issuing from the outlet $d$ commingles the sirup and soda-water simultaneously with their contact, and the handle $h$ being then raised, the aerated water rushes from the lateral orifices $e$, striking the adjacent interior portion of the tube $a$ and thence falling into the tumbler with a diminished force and without danger of liberating the gas with which it is charged. The streams may, however, be simultaneously drawn from the passage or outlet $d$ and through the orifices $e$ and tube $b$, the central stream through its force intermixing the aerated water and sirup, while the surrounding shower insures the proper impregnation or aeration of the beverage.

We are aware that it is not new to draw soda-water from large and small outlets or in large and small streams, and also that it is not new to interrupt or intercept its direct flow. Several arrangements for these purposes have been devised, but the construction herein described and invented by us we consider to be the most convenient and practical for the satisfactory preparation of soda-water beverages.

We claim—

The construction of a draft tube for soda-water apparatus with an inner tube, $b$, having an outlet, $d$, and lateral orifices $e$, opening into the tube $a$ and controlled by a gate, $f$, the whole being constructed and arranged to operate substantially as set forth.

In witness whereof we have hereunto set out hands this 31st day of December, A. D. 1864.

FREDERICK A. WEBER.
WILLIAM H. GREENE.

In presence of—
J. B. CROSBY,
F. GOULD.